(12) United States Patent
Rossi

(10) Patent No.: US 6,861,590 B2
(45) Date of Patent: Mar. 1, 2005

(54) STRIPPABLE CABLE

(75) Inventor: Michael T. Rossi, Maiden, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/319,617

(22) Filed: Dec. 16, 2002

(65) Prior Publication Data

US 2004/0112629 A1 Jun. 17, 2004

(51) Int. Cl.[7] .............................................. H01B 11/02
(52) U.S. Cl. ................. 174/113 R; 174/115; 174/117 F
(58) Field of Search ............................. 174/113 R, 115, 174/70 A, 117 F; 385/102, 109, 110, 111

(56) References Cited

U.S. PATENT DOCUMENTS

| | | |
|---|---|---|
| 2,628,998 A | 2/1953 | Frisbie |
| 4,467,138 A | 8/1984 | Brorein |
| 4,729,628 A | 3/1988 | Kraft et al. |
| 4,763,983 A | 8/1988 | Keith |
| 5,180,890 A | 1/1993 | Pendergrass et al. |
| 5,442,722 A | 8/1995 | DeCarlo |
| 2002/0125036 A1 * | 9/2002 | Price et al. ............. 174/113 R |
| 2003/0095763 A1 * | 5/2003 | Dallas et al. ............... 385/109 |

* cited by examiner

Primary Examiner—Chau N. Nguyen
(74) Attorney, Agent, or Firm—Sughrue Mion, PLLC

(57) ABSTRACT

A cable with a ripcord disposed in the webbed connection portion between the messenger portion and the communications portion of the cable, the ripcord allowing for easy separation of the messenger portion from the communications portion of the cable. The figure-8 cable with a ripcord allows for doing away with or minimizing the need to access the cable with pocket knives, box cutters, razor blades, scalpels and other tools of dangerous implementation, all of which enjoy various levels of imprecise results. The connection portion may have an internal or external weakened section to facilitate the separation.

8 Claims, 4 Drawing Sheets

STRIPPABLE CABLE

FIELD OF THE INVENTION

The invention relates to cable. More particularly, the invention relates to a cable being readily strippable between load bearing and communications portions.

BACKGROUND OF THE INVENTION

Conventional communications cables with a supporting messenger are known in the art. It is particularly known to provide a figure-8 type copper aerial cable in which one portion of the cable is the supporting messenger portion and the other portion of the cable is the communications portion including optical fibers. Such an arrangement is disclosed in U.S. Pat. No. 4,763,983 which is incorporated herein by reference.

During installation, ends of the cable customarily need to be spliced together. Furthermore, communications elements may be routed from one communications cable to a plurality of additional communications cables, as required by individual signal paths. Invariably, such interconnection requires the separation of the messenger portion from the communications portion.

Separation of the messenger and communications portions has heretofore been accomplished with pocket knives, box cutters, razor blades, scalpels and other tools of dangerous implementation to various levels of imprecise results. Using such techniques has heretofore been accepted as involving necessary risks. These risks range from attenuated signal line loss all the way to complete signal loss and/or damage to the communications elements, or, even worse, lacerations and accidental incisions to the appendages of those installing the cable.

SUMMARY OF THE INVENTION

Illustrative, non-limiting embodiments of the present invention overcome the disadvantages described above and other disadvantages. In an illustrative, non-limiting implementation, a strippable messenger communications cable is provided.

A non-limiting embodiment of the invention is directed to a cable which comprises a load bearing portion; a communications conveying portion; a connection portion interconnecting the load bearing portion with the communications conveying portion; and a ripcord located at least partially within the connection portion and extending longitudinally to facilitate separation of the communications conveying portion from the load bearing portion. According to a further aspect of the invention, the connection portion may have a weakened section, provided in conjunction with the ripcord or independently of the ripcord.

DESCRIPTION OF ILLUSTRATIVE NON-LIMITING EMBODIMENTS OF THE INVENTION

The following description of illustrative non-limiting embodiments of the invention discloses specific configurations and components. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention that are known to one skilled in the art are omitted for the sake of clarity and brevity.

Figure 1:
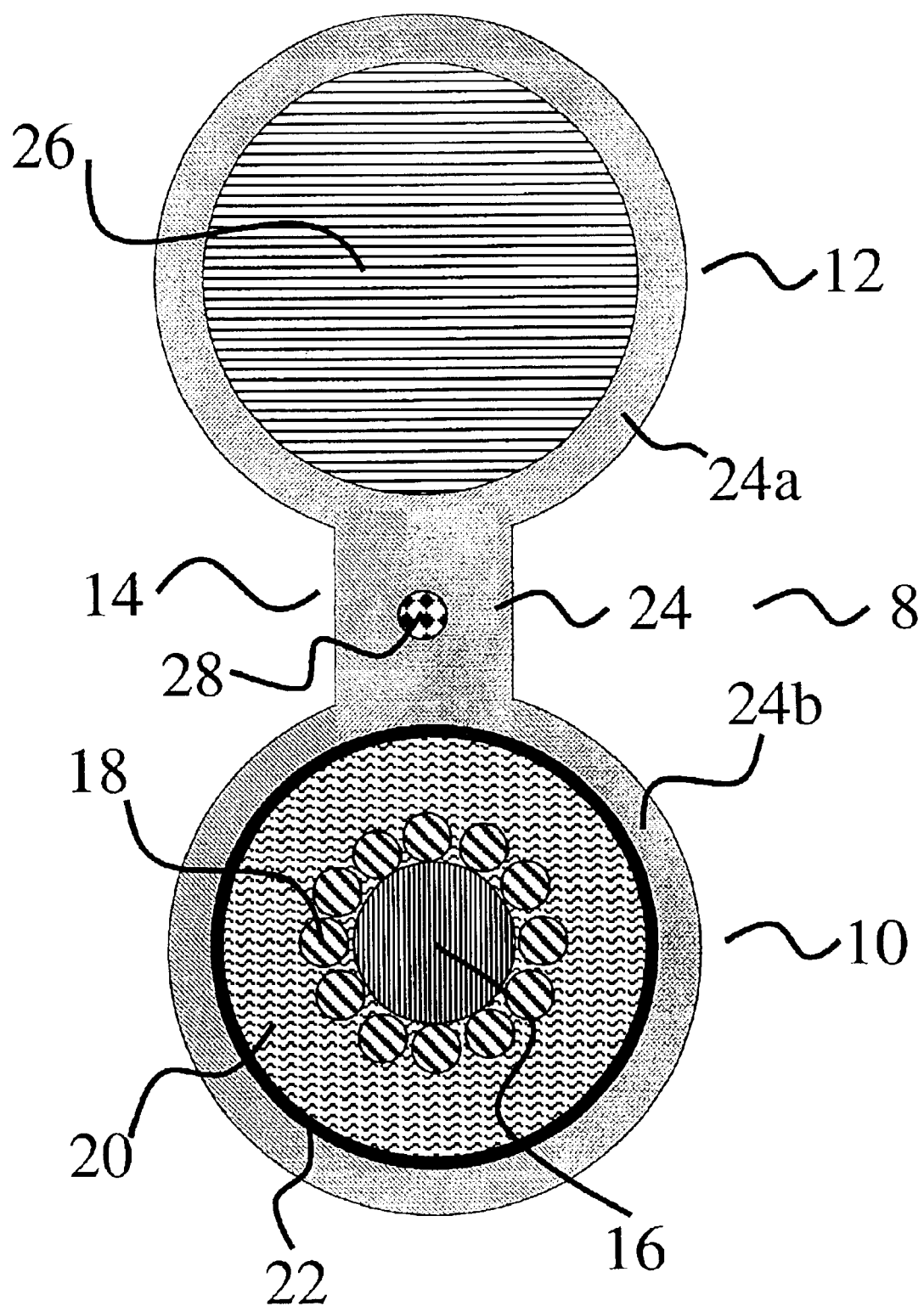
FIG. 1 is a cross-sectional view of a cable in accordance with a non-limiting aspect of the present invention including a ripcord.

FIG. 1 shows a non-limiting embodiment of the present invention. The invention is directed to a cable 8 comprising a load bearing portion 12; a communications conveying portion 10; a connection portion 14 interconnecting the load bearing portion 12 with the communications conveying portion 10; and at least one ripcord 28 located at least partially within the connection portion 14 and extending longitudinally along the cable 8 to facilitate separation of the communications conveying portion 10 from the load bearing portion 12.

The ripcord 28 may include any conventional ripcord made of, for example high-tensile strength glass, aramid, polyester, polymer, carbon or fiber filament. Further, the ripcord 28 may be color coded to distinguish the ripcord 28 from the connection portion 14. In addition, it should be understood that one or more ripcords can be used.

The load bearing portion 12 may include a strength member 26 surrounded by a conventional plastic jacket (first jacket) 24a. The strength member 26 is also conventional and may be made of, for example, a fiber reinforced plastic rod or a metal, such as steel. The communications conveying portion 10 includes optical fibers and/or electrical wires (e.g., copper, copper alloy, aluminum and aluminum alloy). The invention is not limited to any particular design of the communications conveying portion 10. However, as is conventional, the communication conveying portion illustrated in FIG. 1 includes a reinforcing member 16 around which optical fibers 18 are arranged. To protect the optical fibers 18, a relatively soft layer 20, such as yarn or jell, is provided around the optical fibers and a tape 22 is wrapped around the yarn layer. Finally, a protective jacket (second jacket) 24b, made of polyethylene or the like, is provided around the tape 22.

As further illustrated in FIG. 1, the connection portion 14 may be made of the same material as the first and second jackets 24a and 24b. More specifically, according to a preferred embodiment of the invention, a suitable plastic may be extruded around the strength member 26 and the optical fiber structure described above to form a cable having a figure-8 cross-section. In this manner, the first and second jackets 24a and 24b and the connection portion 14 will be unitary. Further, the ripcord 28 may be completely or partially embedded in the connecting portion during the extrusion process described above. For example, the ripcord may be arranged in a serpentine manner with the turns being exposed to the outside to allow easy access to the ripcord along the length of the cable.

Figure 2:
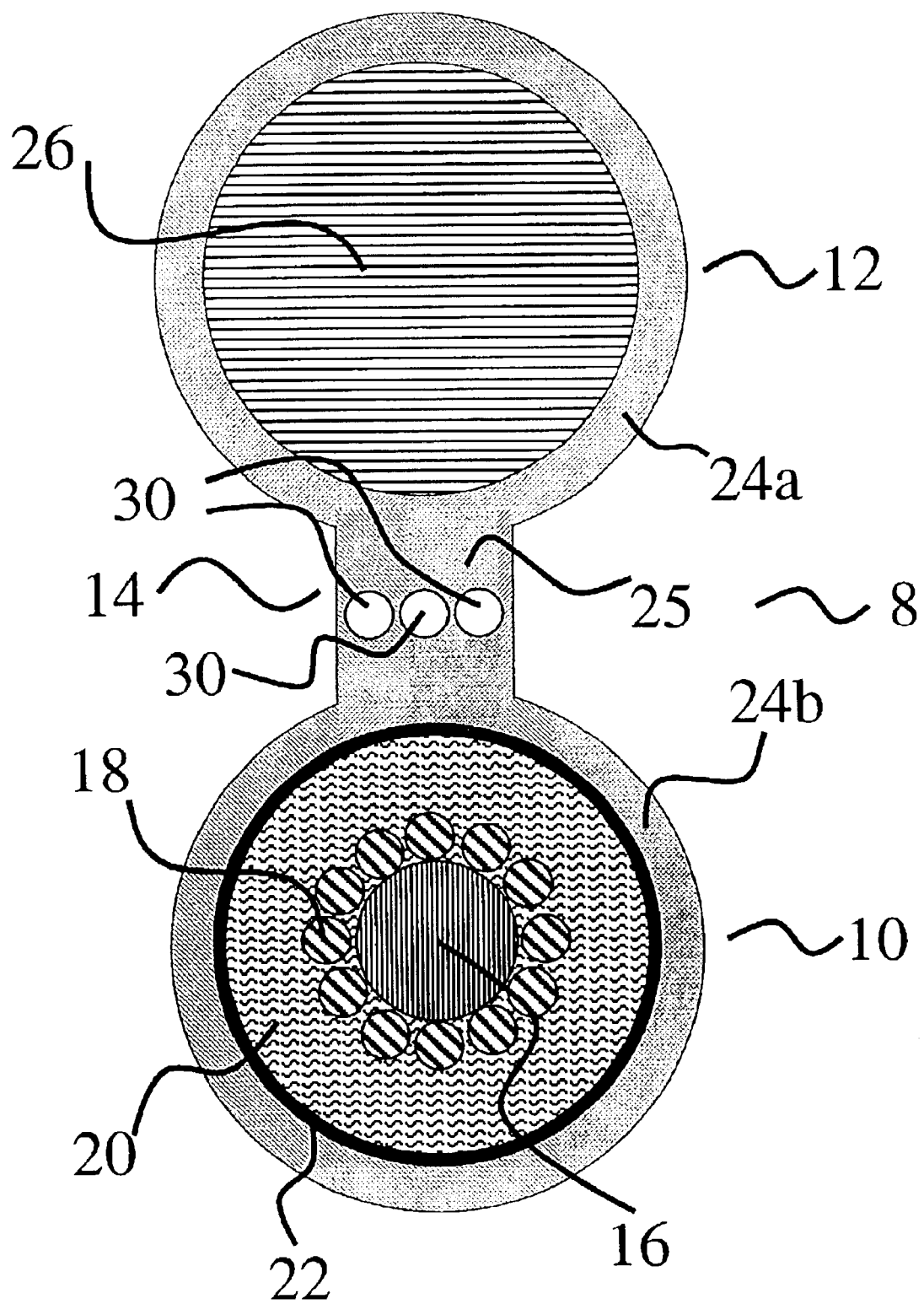
FIG. 2 is a cross-sectional view of a cable in accordance with a further non-limiting aspect of the present invention including a weakened section.

FIG. 2 shows another non-limiting aspect of the present invention, wherein the connection portion 14 includes a weakened section 25, instead of a ripcord. The weakened section 25 may include at least one perforation 30 extending internally and longitudinally along the connection portion 14. The weakened section 25 with at least one perforation 30 acts to facilitate separation of the load bearing portion 12 from the communications conveying portion 10. The weakened section 25 must be designed to insure that the connection portion 14 is sufficiently strong to support the communications conveying portion 10 on the load bearing portion 12 so that the two will not be inadvertently separated from one another in use. On the other hand, the purpose of providing the weakened section 25 is to allow a worker to cut the plastic so the communications conveying portion 10 can be separated from the load bearing portion 12 in the field.

Figure 3:
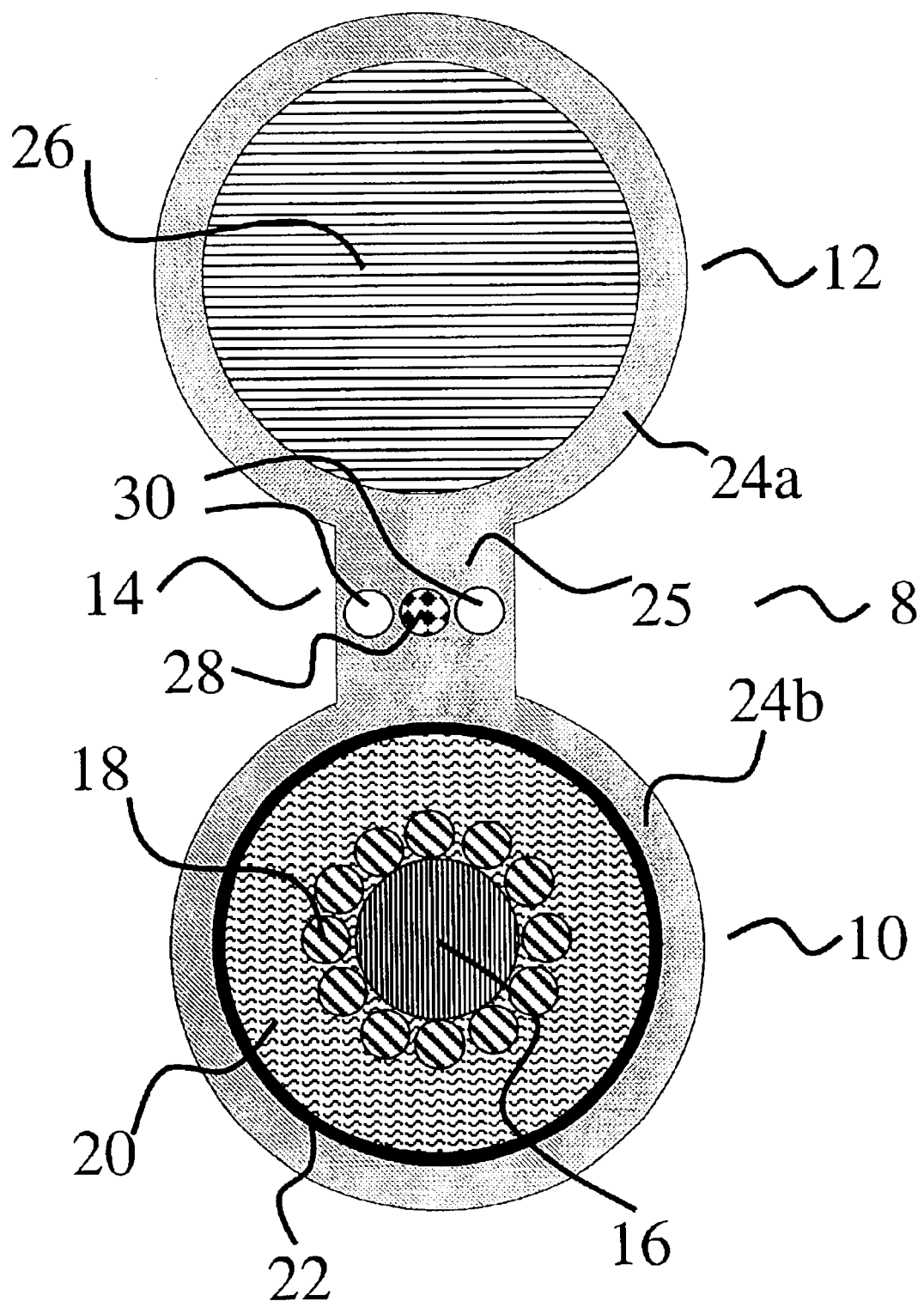
FIG. 3 is a cross-sectional view of a cable in accordance with an additional non-limiting aspect of the present invention including a ripcord disposed adjacent to a weakened section defined by a perforation.

FIG. 3 shows another non-limiting aspect of the present invention, wherein the connection portion 14 includes at least one ripcord 28 in conjunction with the weakened section 25, as described above.

Figure 4:
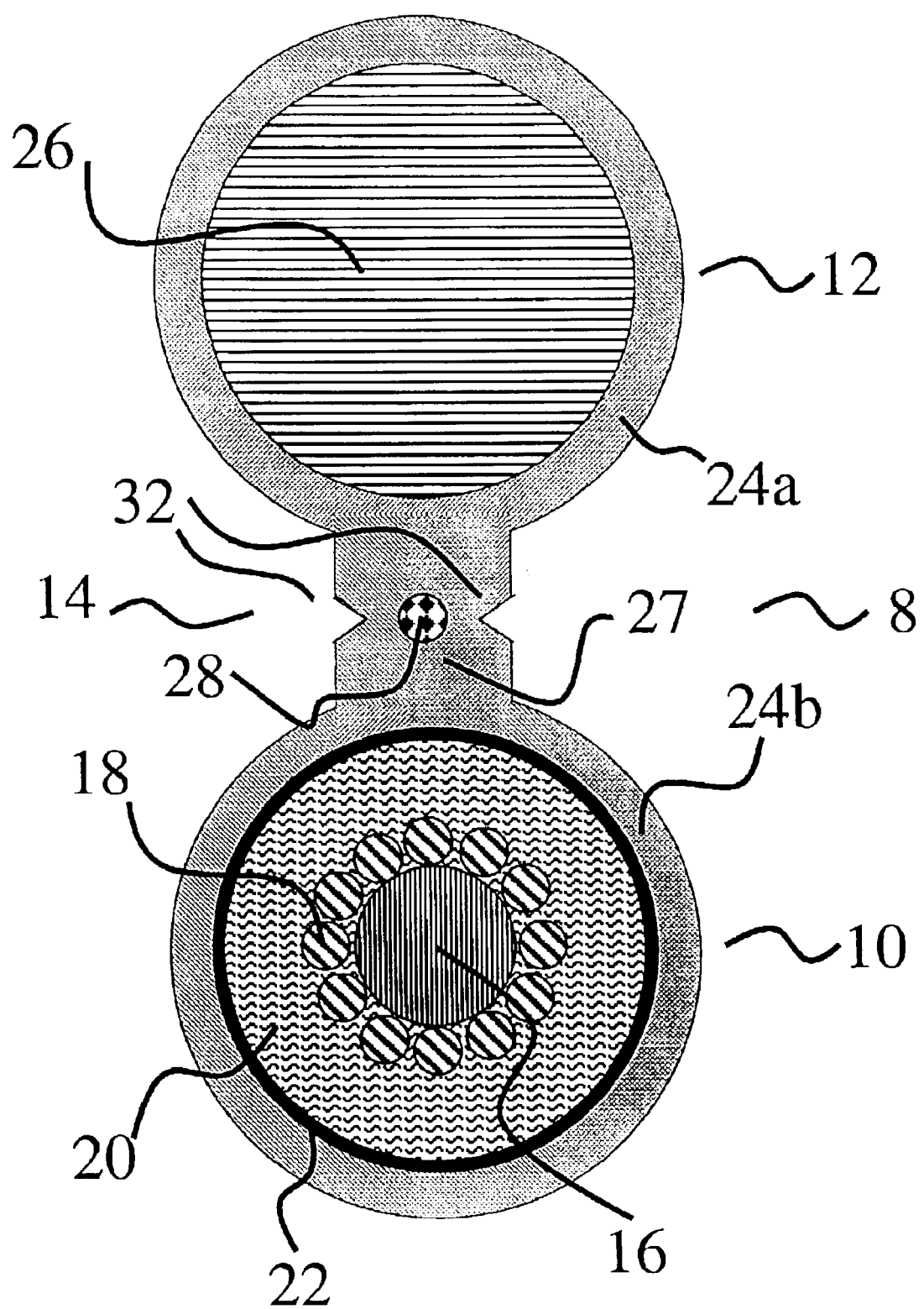
FIG. 4 is a cross-sectional view of a cable in accordance with a further non-limiting aspect of the present invention including a ripcord disposed adjacent to a weakened section, the weakened section including a groove or grooves.

FIG. 4 shows another non-limiting aspect of the present invention, wherein the connection portion 14 includes at least one ripcord 28 in conjunction with an external weakened section 27. In this embodiment, the weakened section 27 comprises at least one groove 32 extending along the outside of the connection portion 14 with ripcord 28 extending longitudinally along the cable adjacent to the groove or grooves 32.

The cable of the invention including a ripcord allows for the doing away of or the minimizing of the need to access the cable with pocket knives, box cutters, razor blades, scalpels and other tools of dangerous implementation.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A cable comprising:

a load bearing portion;

a communications conveying portion, including at least one communications element; and a connection portion interconnecting said load bearing portion with said communications conveying portion, wherein said connection portion includes a weakened section for facilitating separation of said load bearing portion from said communications conveying portion, said weakened portion including at least one perforation extending longitudinally and internally within said connection portion, said at least one perforation possessing no surface area on an external surface of said connection portion.

2. The cable of claim 1, wherein said load bearing portion includes a reinforcing member and a first jacket surrounding said reinforcing member.

3. The cable of claim 2, wherein said communications conveying portion includes a strength member and a second jacket surrounding said strength member and said at least one communications element.

4. The cable of claim 3, wherein said connection portion is connected to said first and second jackets.

5. The cable of claim 3, wherein said load bearing portion, said connection portion and said communications conveying portion together form a figure-8 shape in cross-section.

6. The cable of claim 4, wherein said connection portion is unitary with said first and second jackets.

7. The cable of claim 1, further comprising a ripcord located at least partially within said connection portion and extending longitudinally along said connection portion.

8. A cable comprising:

a load bearing portion;

a communications conveying portion, including at least one communications element; and a connection portion interconnecting said load bearing portion with said communications conveying portion; wherein said connection portion includes a weakened section for facilitating separation of said load bearing portion from said communications conveying portion, said weakened portion including at least one perforation extending longitudinally and internally within said connection portion, said at least one perforation possessing no surface area on an external surface of said connection portion; and said connection portion further including a ripcord located at least partially within said connection portion and extending longitudinally along said connection portion.

* * * * *